United States Patent [19]

Kellermann et al.

[11] 4,183,979
[45] Jan. 15, 1980

[54] METHOD OF ALIGNING AND COATING

[75] Inventors: Arnold L. Kellermann, Goshen; David I. McDonald, Cincinnati, both of Ohio; Robert J. Grone, Covington, Ky.

[73] Assignee: Cincinnati Milacron Inc., Cincinnati, Ohio

[21] Appl. No.: 905,381

[22] Filed: May 12, 1978

Related U.S. Application Data

[62] Division of Ser. No. 809,799, Jun. 24, 1977, Pat. No. 4,104,984.

[51] Int. Cl.$^2$ ............................................. B05D 1/28
[52] U.S. Cl. .................................................. 427/211
[58] Field of Search .............. 427/428, 365, 429, 366, 427/209, 210, 211; 118/225, 226, 228, 248, 249, 250, 251, 255, 500; 198/229, 424, 427, 430, 436, 535

[56] References Cited

U.S. PATENT DOCUMENTS

| | | | |
|---|---|---|---|
| 1,837,607 | 12/1931 | Biggert, Jr. | 198/424 |
| 2,144,924 | 1/1939 | King | 118/227 X |
| 3,237,555 | 3/1966 | Jones et al. | 101/38 R |

Primary Examiner—Morris Kaplan
Attorney, Agent, or Firm—James D. Liles; Daniel P. Worth

[57] ABSTRACT

A method and apparatus are disclosed for precision placement of a workpiece onto a transport member. A plurality of workpieces are aligned in a predetermined spacial relationship upon an infeed conveyor. The workpieces are then moved transversely off the conveyor and dropped through a pair of counter-rotating lubricating rollers. An arcuate chute directs the workpieces from the lubricating rollers to a horizontally disposed planar surface where they are realigned by a cooperating scraper positioned intimately above. Relative movement between the scraper and the planar surface causes to workpieces to be discharged from the surface and precisely deposited upon the transport member.

8 Claims, 10 Drawing Figures

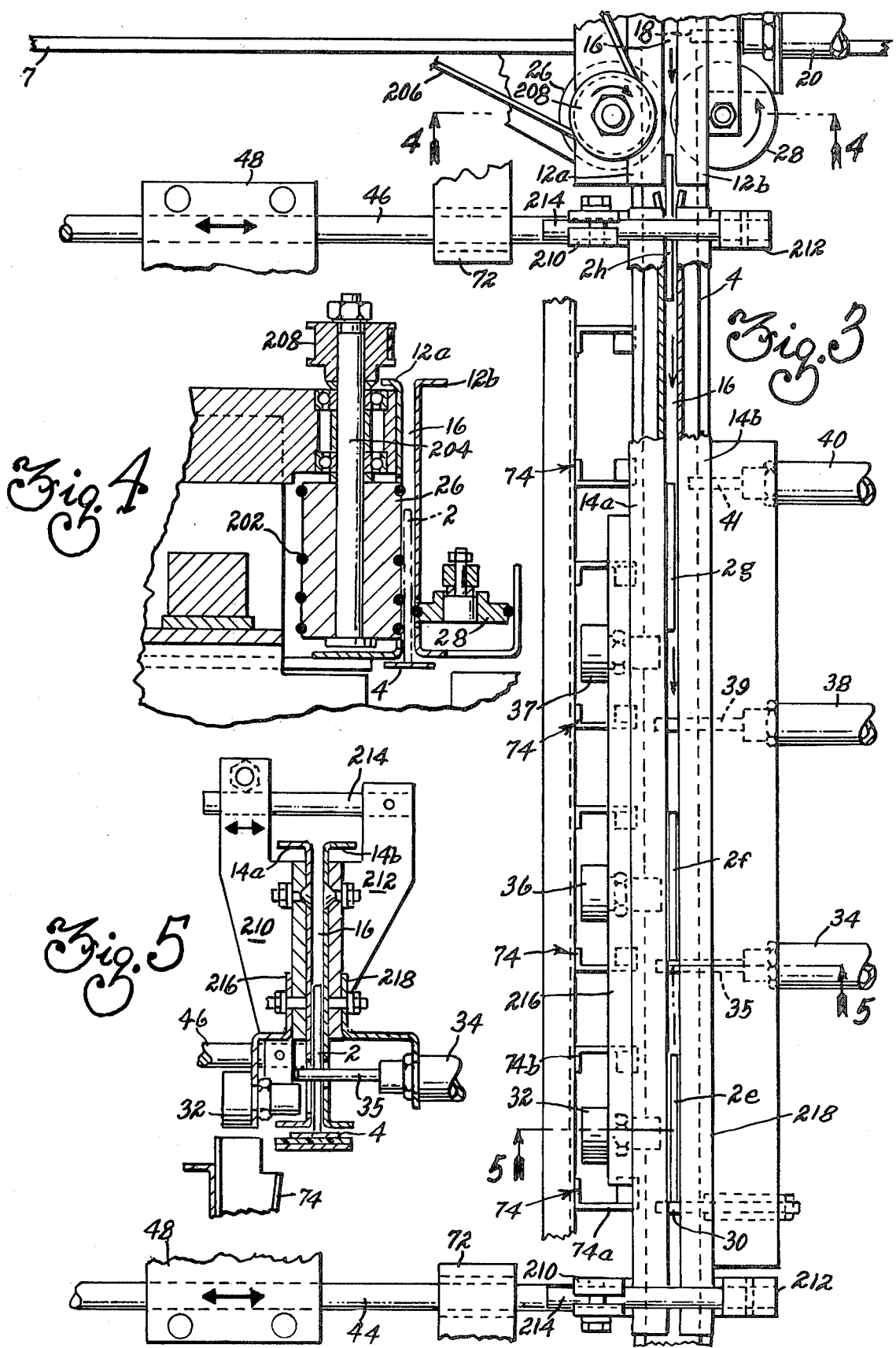

METHOD OF ALIGNING AND COATING

This application is a division of application Ser. No. 809,799, filed June 24, 1977, now U.S. Pat. No. 4,104,984.

BACKGROUND

The present invention relates to a method of positioning a plurality of workpieces in a predetermined alignment and will be disclosed in connection with a mechanism for treating and aligning flattened square pieces of thermoplastic resin for placement upon a conveyor.

In the processing of thermoplastic resin, an especially quick method of forming thermoplastic containers or other articles has developed which utilizes extruded or coextruded square chips or blanks. These chips are heated to a temperature above their softening point but below the melting point to facilitate subsequent biaxial orientation of the chip material in a forging and forming process. The chips are forged into a preform from which the final product, such as a container, is thermoformed. This process has been termed "scrapless thermoforming" and is more fully described in U.S. Pat. Nos. 3,739,052 and 3,947,204.

Transfer of the workpiece or chips from the thermal conditioning process must occur in such a way that the chip retains uniformity of temperature, is not unduly or unevenly chilled, and suffers no appreciable temperature drop nor any physical distortion from its flattened state. The ultimate product, which may take the form of a deep dish or tub of the type used for butter, cottage cheese and margarine, may be substantially distorted or defective if the chip is subjected to thermal nonuniformity. Hence, the transfer mechanism used to transport the chip throughout this process should work fast enough to minimize temperature changes and heat losses while at the same time avoiding physical distortion of the workpiece.

In order to realize these multiple objectives, the present invention provides a mechanism for precision placement and alignment of the workpieces upon a transport member immediately prior to the thermal conditioning. Such an alignment permits a second transfer mechanism to rapidly translocate the chips from the transport member following the heating process, to a forge with minimal physical distortion and heat loss.

SUMMARY OF THE INVENTION

Apparatus to practice the method of the invention is disclosed in its preferred embodiment as an apparatus for aligning and depositing a plurality of thermoplastic chips unto transport member. The apparatus comprises a base and an infeed conveyor upon which workpieces are aligned in a fixed spacial relationship. The apparatus moves the workpieces in a direction transverse to the direction of conveyor movement and discharges the workpieces in the fixed spacial relationship. The workpieces are permitted to drop from the infeed conveyor discharge position under the influence of gravity until the movement is interrupted and the workpieces are directed onto a planar surface. After realignment, the apparatus removes the workpieces from the surface and deposits them upon the transport member for further processing.

The preferred embodiment aligns the workpiece by a series of sequentially operated gates extending across the infeed conveyor. A lateral actuator transversely moves the aligned workpieces off the conveyor and drops them through a pair of counter rotating lubrication rollers and an arcuate chute to a horizontal surface. Workpieces are scraped off the horizontal surface in a manner that realigns and releases them without horizontal components of discharge velocity.

A method for precise workpiece alignment includes moving the workpieces upon an infeed conveyor and aligning those workpieces. The workpiece motion is then terminated in the direction of primary conveyor movement while relative movement by the underlying conveyor is permitted. The workpieces are discharged from the infeed conveyor in a direction transverse to the primary conveyor movement and guided in subsequent gravity biased movement onto a planar surface. The workpieces are then scraped from the planar surface onto a transport member.

BRIEF DESCRIPTION OF THE DRAWINGS

FIG. 3 is a plan view of a portion of the embodiments of FIGS. 1 and 2 taken in the direction of arrow 3 in FIG. 2.

FIG. 4 is cross sectional elevational view taken in the direction of line 4—4 in FIG. 3.

FIG. 5 is a cross sectional elevational view taken in the direction of line 5—5 in FIG. 3.

DESCRIPTION OF THE PREFERRED EMBODIMENT

Figure 1:
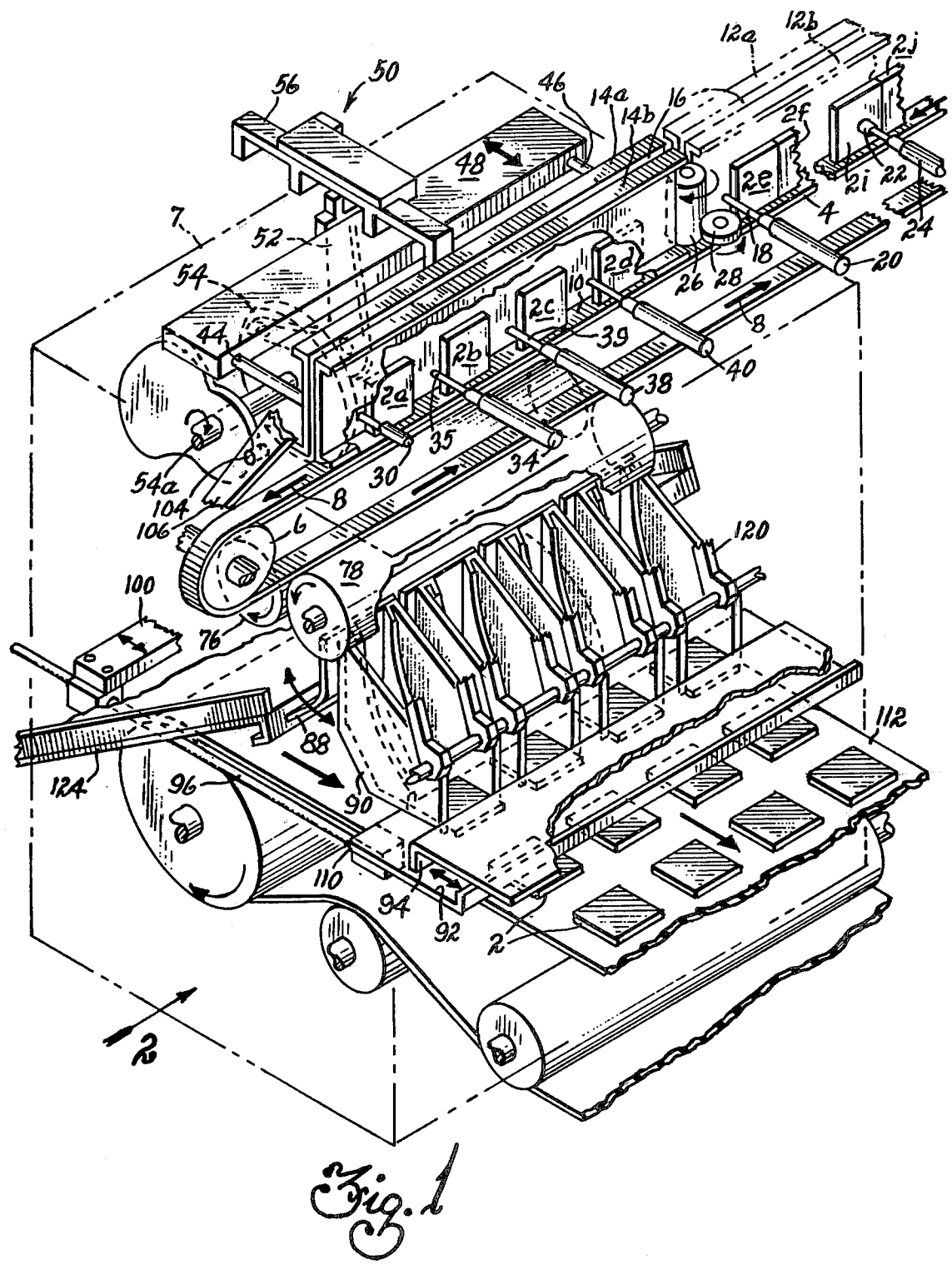
FIG. 1 is an isometric diagrammatic depiction of the preferred embodiment of the invention with details omitted for clarity of illustration.

An overview of the general features of the preferred embodiment is most readily realized from the isometric depiction of FIG. 1. A plurality of workpieces illustrated in the form of square plastic chips 2 are shown supported upon an endless infeed belt 4. The infeed belt 4 is driven by a motor (not shown) which imparts rotary motion to a roller 6 which frictionally engages the infeed belt 4 to effectuate movement in the direction of arrow 8. The chips 2 are transported upon the upper surface 10 of the belt 4 upon their edges in an upright position. Two pairs of lateral guides 12a, 12b, and 14a, 14b are arranged end to end and positioned above the upper surface 10 to maintain the chips 2 in this upright position. Together with the working surface 19 of infeed belt 4, each of the two pairs of lateral guides define a channel 16 therebetween.

The chips 2 are fed onto the infeed belt 4 and move therewith within the channel 16 until the movement of the lead chip 2e is blocked by a gate 18 extending across the working surface 10 within the channel 16. The gate 18 is a piston extension from air cylinder 20, axially extendable and retractable in accordance to air pressure within the cylinder 20. The belt 4 continues its movement after the blockage of chip 2e and relative motion is initiated between the belt and the chip. As successive chips 2(f) through 2(j) etc. continue movement along the working surface 10, each engages the preceeding chip, which prevents further movement; and relative motion between each these chips and the belt 4 is successively initiated. After a predetermined period, preferably sufficient to permit four or more chips to accumulate behind chip 2(e), an engaging element 22 extending from a piston within an air cylinder 24 engages chip 2(i) against the wall of lateral guide 12(a) to prevent movement of this chip. Engagement of chip 2(i) isolates four chips 2(e) through 2(h) [2(g) and 2(h) not shown in FIG. 1] between air cylinders 20 and 24. It should be apparent that a shorter period might be used, however, if less than four chips have accumulated, only that number of chips will be subsequently translocated by the apparatus.

Gate 18 is retracted into cylinder 20 and removed from the channel 16 after the four chips 2(e)–2(h) have accumulated and become isolated. These chips 2(e) through 2(h) are then once more freed for movement with the infeed belt 4. Each of these chips is shortly thereafter successively engaged upon its side portions by a pair of counter rotating rollers 26 and 28. Each of the rollers 26 and 28 have a peripheral velocity which is less than that of the infeed belt 4. Consequently, lead chip 2(e) (as well as the following chips) is advanced at a slower rate than that of the belt 4 when engaged by the rollers 26 and 28; and the chip advancement is accelerated once it is released from its frictional engagement with the rollers. The result of these successive chip engagements is that each engaged chip 2 is advanced at a slower rate than that of its predecesor and a spacing is established between each chip and its successor.

As perhaps best illustrated in the plane view of FIG. 3, and as each of the chips of the isolated group 2(e) through 2(h) is successively metered by rollers 26 and 28 and consequently spaced from the following chip, the group continues movement with the infeed belt 4 in a roughly fixed spacial relationship. The lead chip 2(e) continues its movement until it encounters an end stop 30 which once again interrupts the chip movement and forces relative movement between the chip 2(e) and infeed belt 4, as this latter member continues movement beneath the chip. A workpiece presence detector, shown as an air sensor 32, is juxtaposed to the end stop 30 and detects the presence of the workpiece 2(e). The air sensor 32 generates a signal in response to this workpiece 2(e) presence which activates the first cylinder 34 of plurality of spacing air cylinders 34, 38 and 40. The first of these cylinders (34) axially extends its associated gate 35 across the channel 16 to prevent the movement of advancing chip 2(f) beyond this point. The chip 2(f) will be slightly upstream of gate 35 at the time of the firing of cylinder 34 due to the spacing established by counter-rotating wheels 26 and 28. In a similar manner, air sensor 36 juxtaposed to gate 35, senses the presence of workpiece 2(f) at that location and generates a signal in response to this condition to fire upstream air cylinder 38 which then extends gate 39. In the illustration of FIG. 3, air sensor 36 has already effectuated the extension of gate 39; and air sensor 37, juxtaposed to this latter gate, is awaiting arrival of chip 2(g), which will activate cylinder 40 to extend gate 41. After chip 2(h) advances into engagement with the then extended gate 41, the isolated group of chips 2(e) through 2(h) will have assumed the fixed spacial relationships of chips 2(a) through 2(d) illustrated in FIG. 1, all the chips 2(a)–2(d) being within the channel 16 defined by lateral guides 14(a) and 14(b).

Figure 2:
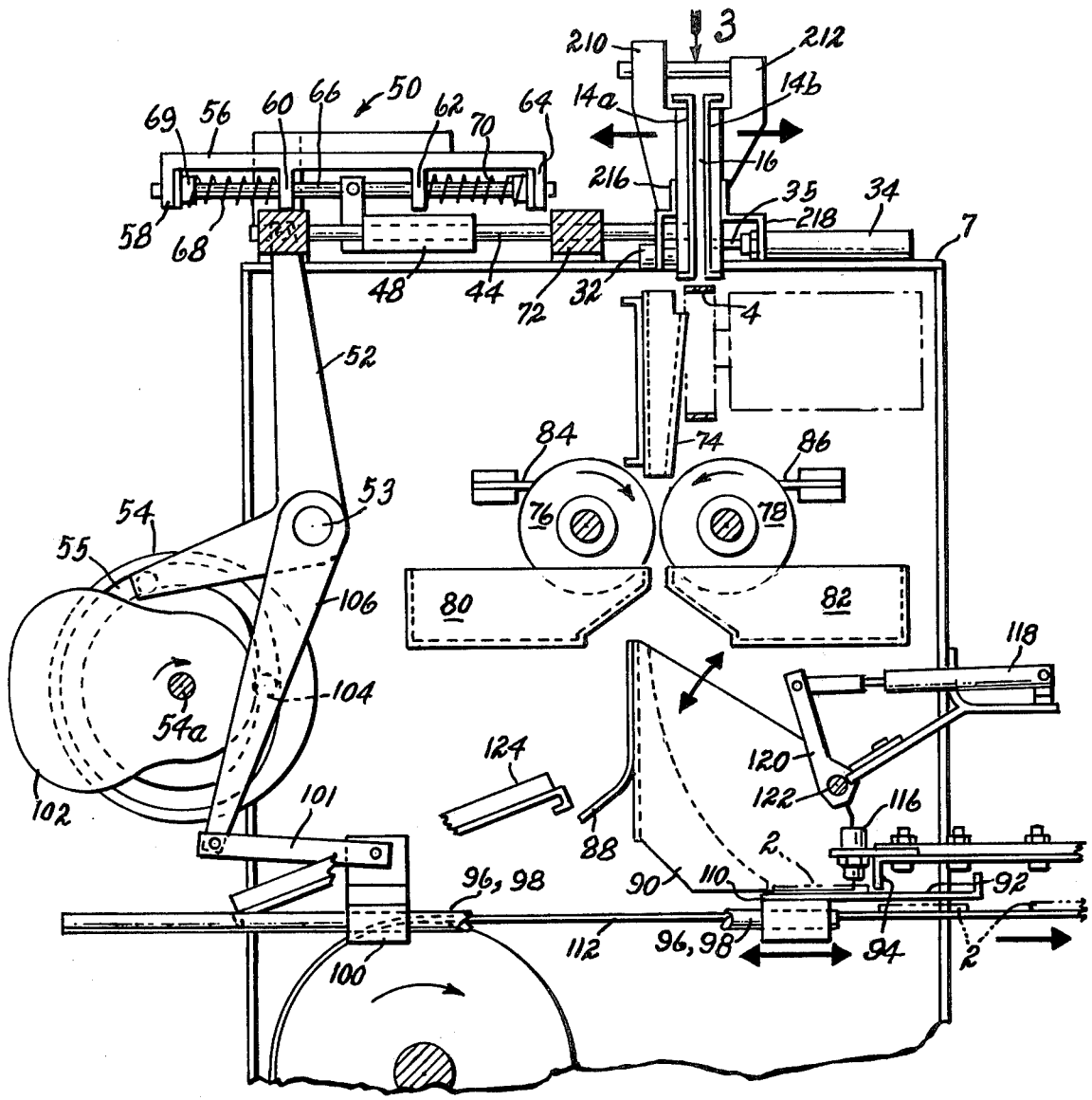
FIG. 2 is a diagrammatic side elevational view, partially in cross-section, of the embodiment of FIG. 1 with details omitted for clarity.

Unlike lateral guides 12(a) and 12(b), lateral guides 14(a) and 14(b) are movable with respect to the base 7 and consequently also with respect to the working surface 10 of the end feed belt 4. Rods 44 and 46 are attached at opposite ends of guide 14(a) and laterally move the guides 14, as well as chips 2(a) through 2(d) contained within the internal channel 16 in a direction perpendicular to the direction of arrow 8 of infeed belt 4. The rods 44 and 46 are both rigidly attached to a common tie bar 48 extending therebetween. As best seen in FIG. 2, lateral motion is imparted to the tie bar 48 by a lateral actuator 50 which is itself moved by a lever 52 directed by a cam 54.

One end of lever 52 has a cam follower which tracks an eccentric groove 55 within a cam 54 to rotate lever 52 about pivot 53. The cam 54 is drivingly rotated by a shaft 54a, to which it is affixed. The opposite end of lever 52 is pivotally connected to a carriage 56 of lateral actuator 50. The carriage 56 has four flanges 58, 60, 62 and 64 with coaxial bores, through which a single carrier rod 66 extends. Overload springs 68 and 70 are supported upon carrier rod 66, the former spring 68 being disposed between flanges 58 and 60 and the latter spring being disposed between the flanges 62 and 64. Motion of lever 52 is transmitted to the carriage 56 which in turn transmits its motion to one of the two overload springs 68 or 70, all in accordance with the dictates of the eccentric groove 55.

As the cam follower upon lever 52 drops downwardly in FIG. 2, the opposite end of lever 52, adjacent carriage 56, is moved to the left; and flange 60 communicates this force to an overload spring 68. Under normal operating conditions, the overload spring 68 behaves as a solid and merely transmits the motion to a spring seat 69, which in turn transmits the force to a collar (not shown) rigidly attached to the carrier bar 66. Movement of the carrier bar 66 forces movement of the tie bar 48 as well as rods 44 and 46 rigidly attached thereto. The rods 44 and 46, it will be recalled, are connected to lateral guides 14(a) and 14(b), and laterally displace the supports 14 with the movement of carrier rod 66. Bearing supports 72 are mounted upon base 7 between the tie bar 48 and lateral supports 14 to slidingly support the rods 44 and 46. A similar action occurs through spring 70 whenever the cam follower is forced upward and the carrier rod 66 is moved toward the right in FIG. 2.

As should be apparent from the above description, the function of the overload springs 68 and 70 is to prevent machine destruction in the rare occurence of a machine misoperation. If, for example, an object interferes with the lateral movement of guide supports 14, the movement of the carrier rod 66 is also hindered. Carriage 56 is still permitted to move with the dictates of eccentric cam 54. In this situation, however, the bias of one of the overload springs 68 or 70 will be overcome and relative motion between the carrier bracket 56 and the carrier rod 66 will accomodate the movement of lever 52 without machine destruction. Positioning the spring 68 and 70 at each end of the carrier rod 66, of course, insures that relative motion with the carrier bracket 56 will result whether the interference is encountered in the initial or return movement of the guides 14.

When the cam follower upon lever 52 is moved downwardly, and lateral guides 14 are moved to the left in FIG. 2 by rods 44 and 46, the chips 2(a) through 2(d) within channel 16 are transversely moved across the infeed belt 4 in a direction perpendicular to the direction of arrows 8 (FIG. 1), representing the direction of infeed belt 4 movement. As the chips 2(a) through 2(d) are transversely moved beyond the edge of the infeed belt 4, subjacent support of the chips is abandoned; and the chips 2(a) through 2(d) fall in gravity biased movement through a plurality of guide chutes 74 (shown in FIGS. 2 and 3), horizontally offset and beneath the infeed belt 4. The chutes 74 are constructed of paired elongated and tapered C-shaped channel members 74(a) and 74(b) which convergingly direct and guide the chips into the nip of a pair of counter-rotating lubricating rollers 76 and 78. The roller 76 and 78 apply lubricant, silicone in the preferred embodiment, to the side surfaces of chips 2. Containers 80 and 82 are disposed beneath rollers 76 and 78 respectively to maintain lubricant reservoirs, into which the rollers 76 and 78 are partially submerged. Doctor blades 84 and 86 are positioned upon each of the rollers to remove excess silicone prior to roller contact with the chips.

After receiving the lubricant coating, the chips 2 continue to drop until their gravity bias movement is once again interrupted by one of two sets of back-to-back arcuate chutes 88 or 90 (FIGS. 1 and 2). The primary set of arcuate chutes 90 receive the chips 2 under normal operating conditions. The chutes 90 direct the chips along their arcuate paths onto a substantially horizontally disposed planar surface 92, positioned immediately below the chutes 90.

A scraper 94 is horizontally spaced from the terminus of chute 90 and intimately positioned above the planar surface 92. The scraper 94 cooperates with surface 92 to scrape chips off the planar surface 92 as this latter element is laterally moved with respect to the scraper 94. A pair of length rods 96 and 98 (FIGS. 1 and 2), rigidly attached to opposite ends of a tie rod 100 are affixed to the surface 92 to effectuate this lateral movement. Motion is imparted to the tie rod 100 (FIG. 2 only) by a link 101 ultimately driven by an eccentric cam 102 affixed to shaft 54(a) in common with cam 54. A follower 104, attached to a lever 106 and pivotally supported upon rod 53, follows the contour of cam 102, which, due to the common drive shaft 54a, moves in timed relationship to cam 54. As the planar surface 92 is moved laterally, the scraper 94 contacts and realigns the workpieces 2 and prevents their further movement. Once the terminus 110 of planar surface 92 passes beneath scraper 94, subjacent support is once again removed and the chips are dropped onto an outfeed belt 112 which, in the preferred embodiment, transports the chips 2 through an oven to permit their thermal conditioning. Since the chips have no horizontal movement immediately prior to their deposit upon the outfeed belt 112, they are discharged without horizontal components of velocity and precisely positioned upon the belt 112.

An air sensor 116 is mounted on the scraper 94 and positioned in proximity to the planar surface 92 to detect the presence or absence of workpieces at that site. An air cylinder 118 is responsive to an error signal generated by the sensor 116 indicative of an unanticipated absence or presence of a workpiece 2. The retraction of the air cylinder 118 moves lever arm 120 to pivot arcuate chutes 88 and 90 about a pivot 122. This movement positions auxiliary chutes 88 beneath the lubricating rollers 76 and 78 and subsequent workpieces will be aborted to the rear of the machine down an abort chute 124. The chips will continue to be aborted from the machine until reset by an operator.

FIGS. 4 and 5 illustrate details of construction of the lateral guide supports 14 as well as the mountings for spacing wheels 26 and 28, air cylinder 34 and air sensor 32. FIG. 4 shows a workpiece 2 between lateral guides 12(a) and 12(b) being released by spacing wheels 26 and 28 which extend into the channel 16. The wheel 26 has rubber ring inserts 202 about its periphery to enhance the frictional engagement with the workpiece 2 and is rotatably mounted upon a drive shaft 204. The drive shaft 204 is rotated by a belt (FIG. 3 only) 206 engaged with a sprocket 208 affixed to its end portion. It should also be apparent that spacing wheel 28 may also be driven by power from belt 206. In FIG. 5, a workpiece 2 is shown blocked by gate 35 within channel 16 between lateral supports 14(a) and 14(b). Reinforcing supports 210 and 212 are attached to the supports 14(a) and 14(b) respectively and fastened together by a tie rod 214. Support brackets 216 and 218 are mounted upon supports 14(a) and 14(b) and in turn support air sensor 32 and air cylinder 34 respectively.

THE ABORT CHUTE CONTROL

Figure 6:
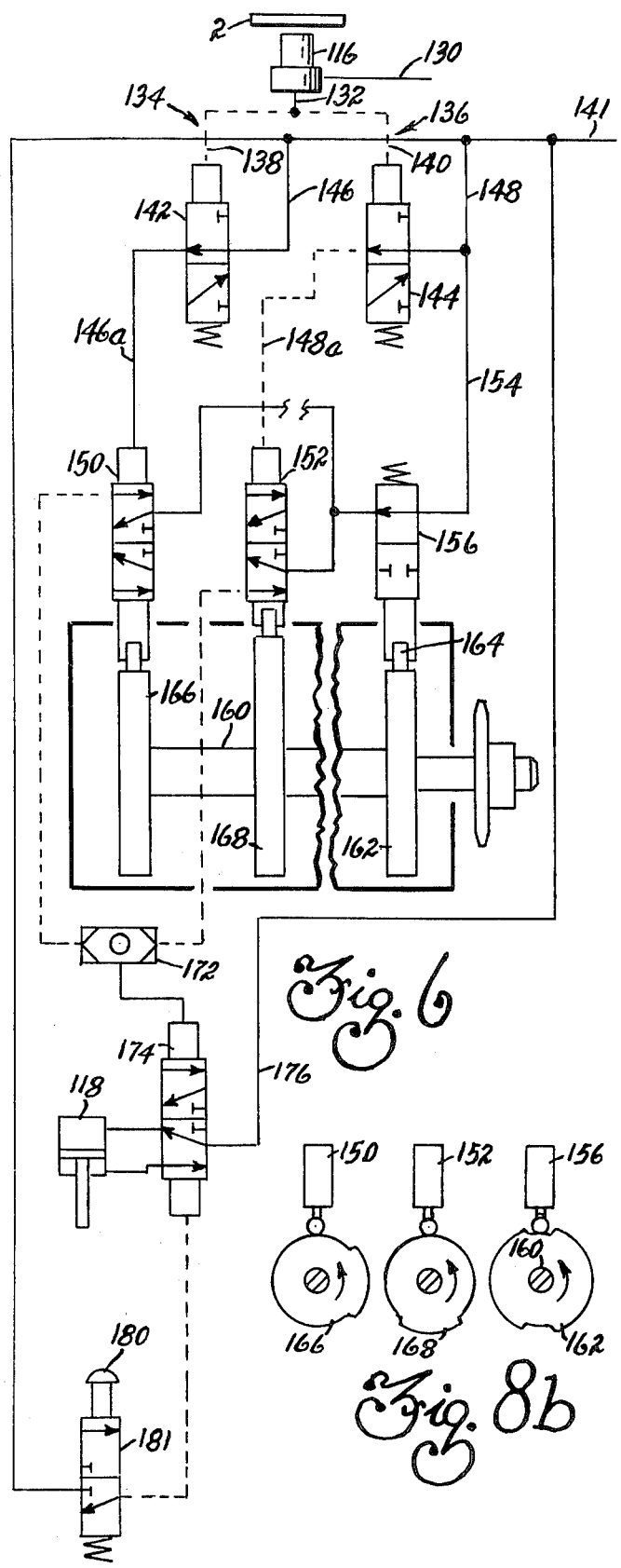
FIG. 6 is a schematic representation of a logic circuit for controlling a workpiece abortion chute depicted in FIGS. 1 and 2.

FIG. 6 is a pneumatic embodiment of a circuit used to control the abort function by pivoting one of the arcuate chutes 88 and 90 about pivot 122 to an abort position. The sensing circuit positions the auxiliary chute 88 beneath the lubricating rollers when the unanticipated absence or presence of a workpiece 2 is detected by the sensor 116. The illustration depicts the sensor 116 detecting a workpiece 2 at an anticipated time; a situation in which the primary chute 90 would be positioned beneath the lubricating rollers. An air conduit 130 supplies pressurized air to the sensor 116 under relatively low pressure (e.g. 2 psig). Whenever a workpiece 2 is sensed by this sensor 116, backflow is initiated through a conduit 132 and into a pair of parallel gating circuits 134 and 136. Circuits 134 and 136 contain conduits 138 and 140 leading to pilot valves or gates 142 and 144, the air pressure within these conduits being utilized to overcome spring biasing of the respective gates and to move the gates from "closed" to "closed port" positions to "open" or "throughport" positions. These gates 142 and 144 control a flow of high pressure air (approximately 60 psig) from conduits 146 and 148 to conduits 146a and 148a, respectively, the conduits 146 and 148 being in fluid communication with conduit 141. The air presence within the conduits 146a and 148a is, in turn, used to actuate gates 150 and 152. Each of the gates 150 and 152 is bi-stable, the gate 150 being operable to permit flow in a first open (throughport) position while the gate 152 is operable to prohibit flow (closed or closed port) in its first position. When activated, gate 150 is moved to a second "closed" position and gate 152 is moved to a second "open" position. A conduit 154 also directs pressurized air from conduit 148 to inlets of the gates 150 and 152 by way of a sampling gate 156. The sampling gate 156 is monostable and spring-biased to an open or through port position. However, as should be apparent from inspection of FIG. 7, this gate is forced to its closed position through approximately 320° of rotation of a shaft 160 in accordance to the dictates of a cam 162 affixed to the shaft. The cam 162 is used to overcome the spring bias and force the sample gate 156 into the closed position via a rolling cam following head 164.

Cams 166 and 168 are also attached to the shaft 160 and restrict the movement of gates 150 and 152. Rolling cam following heads engage cams 166 and 168 and lobes upon these cams limit the movement of the gates toward their second positions during selected angular positions of the shaft 160. Whenever the pressurized air in conduits 146a and 148a activate the gates 150 and 152 and the angular position of the shaft 160 permits, the gates will be moved to their second positions. Air pulses from conduit 154 will pass through the sampling gate 156 (when in the open position) and through the gates 150 or 152 in parallel paths to a shuttle valve 172. This shuttle valve 172 is responsive to air flow from either of the parallel gating circuits 134 or 136 and in turn regulates the movement of a common control gate 174. The common control gate 174 valve the high pressure air from a conduit 176 into the abort chute cylinder 118. A manual abort chute reset button 180 is used to control a gating valve 181 which regulates air flow to the gate 174 from conduit 141. When the button 180 is depressed, air pressure from conduit 141 retracts cylinder 118 to reposition the primary chute 90 beneath the lubricating rollers 76 and 78.

Figure 7A:
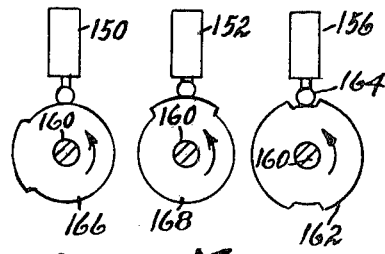
FIG. 7a illustrates the angular position of the control cams depicted in FIG. 6 and their relationship to associated control gates for a no-error condition during a first sampling period.

The operation of the abort control system is best illustrated with a joint showing of FIGS. 6, 7 and 8. FIG. 7a shows the angular position of the cams 166, 168 and 162 as well as gates 150, 152 and 156 in a first (run) condition. Cam 166 is positioned such that gate 150 is permitted to extend to its second or closed position, blocking air flow to the shuttle valve 172 from the circuit 134. The angular position of cam 168 is such that a lobed portion of that cam prevents movement of the gate 152 despite the impetus provided by air pressure within the conduit 148. Cam 162 is positioned such that rolling cam-following head 164 is permitted to extend into the recessed area of that cam 162, enabling pressurized air flow from conduit 154 to reach inlets to gates 150 and 152.

In its first, run, position, a workpiece 2 is anticipated upon planar surface 92. When this condition occurs, sensor 116 directs air flow through conduit 132 and into parallel circuits 134 and 136. The pressure within the conduits 138 and 140 overcomes the spring bias of gates 142 and 144 and permits flow of high pressure air from conduit 141 to enter conduits 146a and 148a. Pressurized air within the conduit 146 is sufficient to move gate 150 to the closed position; and this action prevents pressurized air from reaching the shuttle valve 175 from the circuit 134. Although the pressure in conduit 148a is in excess of the threshold level required for activation of gate 152 under normal circumstances, in this first (run) condition movement of this gate is impeded by the lobe upon cam 168. Gate 152 is thus prevented from moving to the open position; and pressurized air is also prevented from reaching shuttle valve 175 from circuit 136. Consequently, the common gate 174 remains in a closed (closed port) position and the cylinder 118 remains in the "run" position, the primary chute 90 being positioned beneath the lubricating rollers 76 and 78.

Figure 7B:
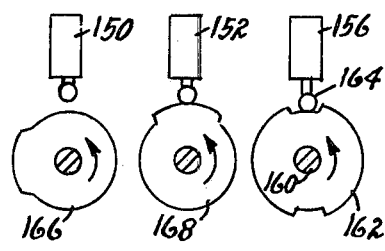
FIG. 7b illustrates the cams and control gate depicted in FIG. 7a for an error signal during a first sampling period.

Inasmuch as a chip presence is anticipated during the first sampling period represented by FIG. 7a, the chip absence is suggestive of a misoperation of the apparatus. FIG. 7b represents this situation, when sensor 116 fails to detect a workpiece 2. The gating in the control circuit is similar to that described in FIG. 7a. However, since no workpiece has been detected neither pilot gate 142 nor gate 150 will be activated, and gate 150 will remain in its normally open position when the sampling signal is received from gate 156. Accordingly, control valve 175 will be activated, moving cylinder 118 to the abort position.

Figure 8A:
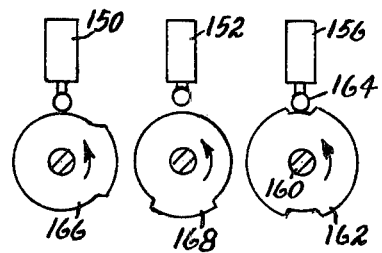
FIG. 8a illustrates the angular positions of the control cams depicted in FIG. 6 and their relationship to associated control gates for a no-error condition during a second sampling period.
Figure 8B:
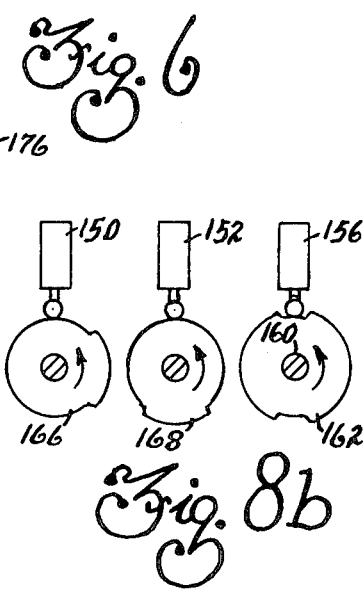
FIG. 8b illustrates the cams and control gates depicted in FIG. 8a for an error signal during a second sampling period.

FIGS. 8a and 8b illustrate a second sampling period representing a 180° counter-clockwise rotation of the shaft 160 from the position illustrated in FIG. 7a. No workpiece is anticipated as being present during this sampling period and a workpiece "presence" signal from the sensor 116 is suggestive of a misoperation. With the cam positions depicted in FIG. 8a, both gates 142 and 144 would be in their closed position, no part presence signal having been communicated from the sensor 116. Gates 150 and 152 are thus closed, the gate 150 maintaining its closed position from its previously obtained second stable condition from the first sampling period. Both parallel gates 150 and 152 are closed, the common control gate 174 remains at its closed position and cylinder 118 remains in its run position.

FIG. 8b represents the status of the gating circuit during the sampling period illustrated in FIG. 8a whenever a workpiece is detected. Since no workpiece is anticipated as being present in this sampling period, the workpiece "presence" signal from sensor 116 opens gates 142 and 144 permitting airflow through conduits 146a and 148a. Gate 150 is uneffected by this sensed condition, having maintained its closed position from the first sampling period. Gate 152 is moved and opened under the resulting air pressure, however, and cylinder 118 is moved to the abort position.

The shaft 160 is preferably moved in timed relationship to movements of workpiece guides 14 and rollers 76 and 78. This is readily accomplished by driving each of these elements with a common power member, each of the shafts 54a, 76, 78 160, etc. being driven through suitable gearing to regulate their respective speeds, as is well known in the art.

Although the present invention has been described in conjunction with the preferred embodiment it is to be understood that modifications and variations may be resorted to without departing from the spirit of the invention as those skilled in the art will readily understand. Such modifications and variations are considered to be within the view and scope of the present invention as defined by the appended claims.

What is claimed is:

1. A method of precisely placing a plurality of planar workpieces upon an outfeed conveyor, comprising the steps of:
   (a) moving the workpieces in a predetermined direction along an infeed conveyor;
   (b) spacing the workpieces upon the infeed conveyor;
   (c) preventing workpiece motion in the predetermined direction and permitting relative movement between the workpiece and the infeed conveyor;
   (d) moving the workpieces in a direction transverse to the predetermined direction to a location beyond the lateral terminus of infeed conveyor and permitting free-falling gravity biased workpiece movement;

(e) interrupting the free-falling gravity biased workpiece movement and guiding the workpieces onto a substantially planar surface; and (f) scraping the workpieces off the planar surface and onto an outfeed conveyor.

2. The method of claim 1 further comprising the step of treating the workpieces with lubricant.

3. The method of claim 2 wherein the step of preventing workpiece motion includes refining of the workpiece spacing.

4. The method of claim 3 wherein the step of preventing workpiece motion includes sequentially extending a plurality of gates across the infeed conveyor.

5. The method of claim 4 further comprising the step of monitoring workpiece presence adjacent one of the gates and extending another gate across the conveyor in accordance to the monitored condition.

6. The method of claim 4 wherein the step of treating the workpieces includes directing the workpieces through a pair of counter-rotating rollers.

7. The method of claim 6 further comprising the step of monitoring workpiece presence upon the planar surface and altering the planar surface onto which the workpiece is guided in accordance to the monitored condition.

8. A method of aligning and treating a plurality of workpieces, comprising:

(a) moving a plurality of workpieces in a predetermined direction on a first transport member;

(b) spacing the workpieces in said predetermined direction along said transport member;

(c) preventing motion of said spaced work-pieces in said direction and with respect to said member;

(d) moving the workpieces in a direction transverse to the predetermined direction to a location beyond the lateral terminus of the transport member and permitting free falling gravity biased workpiece movement;

(e) directing the free falling gravity biased workpieces into the nip of a pair of counter-rotating rollers;

(f) guiding the workpieces from the counter-rotating rollers onto a substantially planer surface; and (g) scraping the workpieces off the planar surface onto a second transport member.

* * * * *